(12) United States Patent
Dupuis et al.

(10) Patent No.: US 10,120,210 B2
(45) Date of Patent: Nov. 6, 2018

(54) FEED-FORWARD OPTICAL EQUALIZATION USING AN ELECTRO-OPTIC MODULATOR WITH A MULTI-SEGMENT ELECTRODE AND DISTRIBUTED DRIVERS

(71) Applicant: INTERNATIONAL BUSINESS MACHINES CORPORATION, Armonk, NY (US)

(72) Inventors: Nicolas Dupuis, New York, NY (US); Tam N. Huynh, White Plains, NY (US); Benjamin G. Lee, Ridgefield, CT (US); Jonathan E. Proesel, Mount Vernon, NY (US); Renato Rimolo-Donadio, Cartago (CR); Alexander V. Rylyakov, New York, NY (US); Clint L. Schow, Santa Barbara, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/385,409

(22) Filed: Dec. 20, 2016

(65) Prior Publication Data

US 2017/0351122 A1 Dec. 7, 2017

Related U.S. Application Data

(60) Provisional application No. 62/345,337, filed on Jun. 3, 2016, provisional application No. 62/404,070, filed on Oct. 4, 2016.

(51) Int. Cl.
*H04B 10/50* (2013.01)
*G02F 1/01* (2006.01)
(Continued)

(52) U.S. Cl.
CPC .......... *G02F 1/0121* (2013.01); *G02F 1/2257* (2013.01); *H04B 10/516* (2013.01); *G02F 2001/212* (2013.01)

(58) Field of Classification Search
CPC ................ G02F 1/0121; G02F 1/2257; G02F 2001/212; H04B 10/516
(Continued)

(56) References Cited

U.S. PATENT DOCUMENTS 3,827,000 A * 7/1974 Matsushita ........... G02F 1/0322
359/259
5,044,714 A * 9/1991 Taylor ..................... H03K 3/72
359/241

(Continued)

OTHER PUBLICATIONS

Heck, SI Fundamentals Short Course Equalization, Jun. 2008, Intel, All Document.*
List of IBM Patents or Applications Treated as Related.

*Primary Examiner* — Ken N Vanderpuye
*Assistant Examiner* — Dibson Sanchez
(74) *Attorney, Agent, or Firm* — Intelletek Law Group, PLLC; Gabriel Daniel, Esq.

(57) ABSTRACT

A device and method of optical equalization using an optical modulator is provided. An electrical modulation signal is split into a first modulation signal and a second modulation signal. The second modulation signal is delayed relative to the first modulation signal. An amplitude of the second modulation signal is attenuated relative to the first modulation signal. The first modulation signal is applied to a first waveguide segment of the optical modulator. The second modulation signal that is delayed and attenuated relative to the first modulation signal is applied to a second waveguide segment of the optical modulator. Both the applied first and second modulation signals generate a feed-forward equalized optical signal that is recombined in the optical domain.

17 Claims, 9 Drawing Sheets

(51) Int. Cl.
   *H04B 10/516* (2013.01)
   *G02F 1/225* (2006.01)
   *G02F 1/21* (2006.01)

(58) Field of Classification Search
   USPC .............................................. 398/182–201
   See application file for complete search history.

(56) References Cited

U.S. PATENT DOCUMENTS

| | | | | |
|---|---|---|---|---|
| 5,157,744 | A * | 10/1992 | Korotky | G02F 1/0327 385/132 |
| 5,355,422 | A * | 10/1994 | Sullivan | G02F 1/0356 385/1 |
| 6,279,150 | B1 | 8/2001 | Hansen | |
| 6,424,452 | B1 * | 7/2002 | Diedrich | G02F 1/0322 359/246 |
| 6,892,001 | B2 * | 5/2005 | Ohta | H04B 10/671 359/558 |
| 7,173,551 | B2 * | 2/2007 | Vrazel | G11C 27/02 341/144 |
| 7,286,726 | B1 * | 10/2007 | Keil | G02F 1/0121 385/1 |
| 7,382,943 | B1 * | 6/2008 | Heaton | G02F 1/2255 385/3 |
| 7,515,775 | B1 * | 4/2009 | Kucharski | G02F 1/025 385/1 |
| 7,826,752 | B1 * | 11/2010 | Zanoni | H04B 10/5055 398/186 |
| 7,934,785 | B2 * | 5/2011 | Lang | B41J 2/2114 347/7 |
| 8,041,226 | B2 * | 10/2011 | Kato | H04B 10/25133 385/88 |
| 8,044,835 | B2 * | 10/2011 | Ehrlichman | G02F 1/0121 341/137 |
| 8,620,115 | B2 * | 12/2013 | Webster | G02F 1/2257 385/1 |
| 9,031,417 | B2 * | 5/2015 | Ehrlichman | G02F 1/0121 398/140 |
| 9,172,472 | B2 * | 10/2015 | Daunt | H04B 10/5561 |
| 9,244,327 | B2 * | 1/2016 | Prosyk | G02F 1/225 |
| 9,319,145 | B2 * | 4/2016 | Noguchi | H04B 10/548 |
| 9,482,925 | B2 * | 11/2016 | Prosyk | G02F 1/225 |
| 9,531,478 | B2 * | 12/2016 | Zheng | H04B 10/2575 |
| 9,733,542 | B2 * | 8/2017 | Bai | G02F 1/225 |
| 9,746,698 | B2 * | 8/2017 | Goodwill | G02F 1/011 |
| 9,746,742 | B2 * | 8/2017 | Cox | G02F 1/2255 |
| 9,853,738 | B2 * | 12/2017 | Ding | H04B 10/5561 |
| 9,874,767 | B2 * | 1/2018 | Ding | G02F 1/0121 |
| 9,900,021 | B1 | 2/2018 | Elliott | H03M 1/66 |
| 2002/0071622 | A1 * | 6/2002 | Betts | G02F 1/2257 385/2 |
| 2003/0170035 | A1 * | 9/2003 | Kisaka | H04J 14/08 398/183 |
| 2005/0036791 | A1 * | 2/2005 | Gunn, III | G02F 1/025 398/183 |
| 2005/0258866 | A1 * | 11/2005 | Mandegaran | H03K 19/00315 326/82 |
| 2007/0212076 | A1 * | 9/2007 | Roberts | G02F 1/225 398/183 |
| 2007/0212079 | A1 * | 9/2007 | Ooi | H04B 10/505 398/198 |
| 2007/0237444 | A1 * | 10/2007 | Keil | B82Y 20/00 385/3 |
| 2008/0089634 | A1 * | 4/2008 | Mosinskis | G02F 1/0121 385/3 |
| 2008/0095486 | A1 * | 4/2008 | Shastri | G02F 1/0123 385/3 |
| 2010/0129088 | A1 * | 5/2010 | Akasaka | H04B 10/50577 398/188 |
| 2011/0044573 | A1 * | 2/2011 | Webster | G02F 1/0121 385/3 |
| 2011/0091221 | A1 * | 4/2011 | De Gabory | H04B 10/505 398/188 |
| 2011/0135242 | A1 * | 6/2011 | Prosyk | G02F 1/225 385/3 |
| 2012/0045163 | A1 * | 2/2012 | Wu | G02F 1/225 385/2 |
| 2012/0045223 | A1 * | 2/2012 | Oku | H04B 10/504 398/201 |
| 2012/0087653 | A1 | 4/2012 | Sawada | |
| 2012/0213531 | A1 * | 8/2012 | Nazarathy | H03M 1/145 398/202 |
| 2012/0224849 | A1 * | 9/2012 | Rylyakov | H04B 10/2507 398/27 |
| 2012/0230626 | A1 * | 9/2012 | Metz | G02F 1/011 385/3 |
| 2012/0237160 | A1 * | 9/2012 | Shastri | G02F 1/0121 385/14 |
| 2012/0246208 | A1 * | 9/2012 | Mallinson | H03H 17/06 708/208 |
| 2012/0251032 | A1 * | 10/2012 | Kato | G02F 1/0327 385/3 |
| 2013/0176609 | A1 * | 7/2013 | Noguchi | H04B 10/5561 359/238 |
| 2013/0272700 | A1 * | 10/2013 | Satoh | H04B 10/50 398/45 |
| 2014/0068534 | A1 * | 3/2014 | Lee | G06F 17/5081 716/111 |
| 2014/0099053 | A1 * | 4/2014 | Sato | G02F 1/0123 385/3 |
| 2014/0112611 | A1 * | 4/2014 | Vermeulen | G02F 1/2257 385/3 |
| 2014/0117873 | A1 * | 5/2014 | Kase | H01S 5/0428 315/287 |
| 2014/0169723 | A1 * | 6/2014 | Kato | G02F 1/011 385/3 |
| 2014/0233962 | A1 * | 8/2014 | Kato | G02F 1/025 398/183 |
| 2014/0321864 | A1 | 10/2014 | Bliss | |
| 2014/0355926 | A1 * | 12/2014 | Velthaus | G02F 1/2255 385/3 |
| 2015/0063822 | A1 * | 3/2015 | Noguchi | G02F 1/0121 398/140 |
| 2015/0110500 | A1 * | 4/2015 | Noguchi | G02F 1/0316 398/142 |
| 2015/0139257 | A1 * | 5/2015 | Raj | H01S 5/068 372/21 |
| 2015/0295650 | A1 * | 10/2015 | Lee | H04B 10/2575 398/115 |
| 2016/0094295 | A1 * | 3/2016 | Doany | H04B 10/508 398/193 |
| 2016/0103340 | A1 * | 4/2016 | Ding | G02F 1/0121 385/2 |
| 2016/0139485 | A1 * | 5/2016 | Winzer | G02F 1/2255 385/3 |
| 2017/0351122 | A1 * | 12/2017 | Dupuis | G02F 1/0121 |
| 2017/0353333 | A1 * | 12/2017 | Dupuis | H04L 25/03076 |

* cited by examiner

FEED-FORWARD OPTICAL EQUALIZATION USING AN ELECTRO-OPTIC MODULATOR WITH A MULTI-SEGMENT ELECTRODE AND DISTRIBUTED DRIVERS

BACKGROUND

Technical Field

The present application generally relates to telecommunication systems, and more particularly, to optical telecommunication systems utilizing equalization techniques.

Description of the Related Art

An electro-optic modulator is an optoelectronic device where a signal-controlled element having an electro-optic effect is used to modulate a beam of light. The modulation may be with respect to the phase, frequency, amplitude, or polarization of the beam of light. Electro-optic modulators are largely used in fiber optical communication systems for realizing high-speed amplitude and phase modulation of optical signals. Various technologies and material platforms can be used to realize an electro-optic modulator. The structure generally includes an optical waveguide that has a refractive index or an absorption that is modulated by applying an RF electrical field that spatially overlaps with an optical mode of the waveguide.

After propagating through an L-long phase modulator, an input optical signal with a wavelength $\lambda$ typically experiences a phase variation provided by equation 1 below:

$$\Delta\varphi = (2\pi/\lambda)\Delta nL \qquad \text{(Eq. 1)}$$

where,
- $\Delta\varphi$ is the phase variation;
- $\Delta n$ is the refractive index change due to the applied electric field; and
- L is the length of the modulator;

Electro-optic modulators can be used in various applications. For example, they can be used as straight-line elements to modulate the amplitude or the phase of an optical signal. Electro-optic phase modulators can also be embedded in Mach-Zehnder structures or resonant structures to realize advanced-modulation transmitters or optical switches. A Mach-Zehnder interferometer (MZI) is a structure that splits a light beam in two optical signals that are phase-modulated relative to each other and then recombined.

In order to improve gigabit transmissions in such communication systems, equalization techniques such as feed-forward equalization (FFE) may be implemented to, among other things, improve bit error rate (BER) performance in communication links.

SUMMARY

According to one embodiment, an optical communication system may include an optical modulator device including a first and a second waveguide segment, wherein the optical modulator device is configured to modulate an incident optical signal. There is a feed-forward equalization circuit that includes a first tap and a second tap. The first tap is coupled to the first segment of the optical modulator. The second tap is coupled to the second segment of the optical modulator. The first tap is configured to generate a first modulation signal. The second tap is configured to generate a second modulation signal. The first modulation signal is attenuated relative to the second modulation signal. The first and the second modulation signals are time-delayed with respect to each other. The recombination of the first tap and the second tap is in the optical domain.

According to another embodiment, a method of optical equalization using an optical modulator is provided. An electrical modulation signal is split into a first modulation signal and a second modulation signal. The second modulation signal is delayed relative to the first modulation signal. An amplitude of the second modulation signal is attenuated relative to the first modulation signal. The first modulation signal is applied to a first waveguide segment of the optical modulator. The second modulation signal that is delayed and attenuated relative to the first modulation signal is applied to a second waveguide segment of the optical modulator. Both the applied first and second modulation signals generate a feed-forward equalized optical signal that is recombined in the optical domain.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The one or more exemplary embodiments described herein provide, among other things, a FFE scheme that is generated within the optical domain using optical modulator devices such as, without limitation, a Mach Zehnder Modulator (MZM), an Electro-Absorption Modulator (EAM), etc.

Figure 1A:
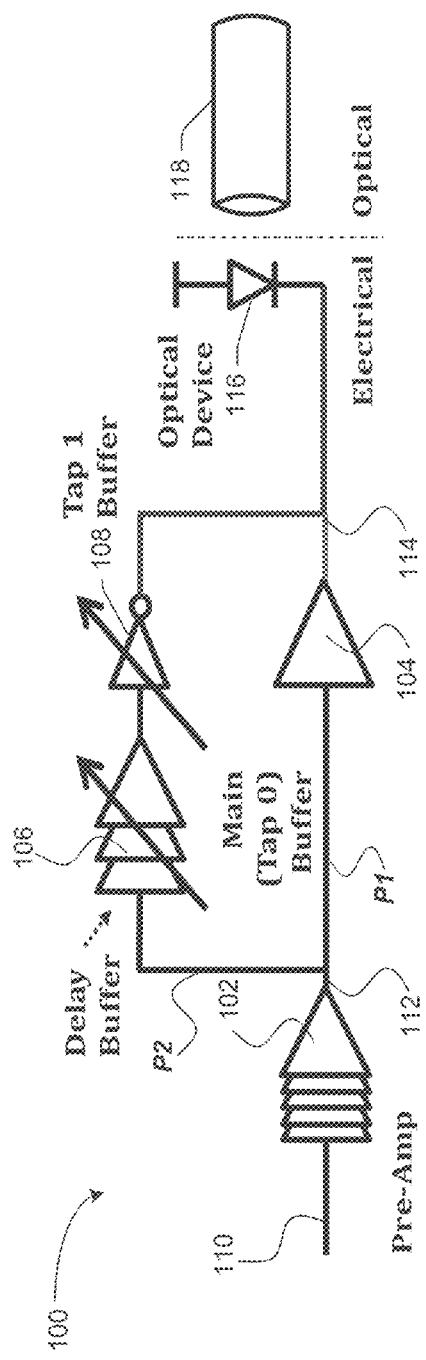
FIG. 1A illustrates an example feed-forward equalization circuit.

Referring to FIG. 1A, an exemplary FFE circuit implementation is depicted. The FFE circuit 100 may include one or more pre-amplifier devices 102, a first electrical path P1 (i.e., sometimes referred to herein as path Tap 0) having a buffer device 104, and a second electrical path P2 (i.e., sometimes referred to herein as path Tap 1) having one or more variable propagation delay buffer devices 106 and an inverter device 108.

The pre-amp 102 may receive, a modulation signal at its input 110. The modulation signal at the input 110 may be a pulse amplitude modulation (PAM) signal, which is a form of signal modulation where the content is encoded in the amplitude of a series of signal pulses. The amplitudes of these series of pulses are varied according to the sample value of the message signal. In various examples, the amplified pulse amplitude modulation signal may be PAM-2, PAM-4, PAM-8, etc., where the PAM number indicates the distinct number of pulse amplitudes that are used to convey the information.

At the output 112 of the one or more pre-amplifier devices 102 the amplified modulation signal is split along paths Tap 0 and Tap 1. In particular, the output 112 of the pre-amplifier devices 102 that is split along path Tap 0, as indicated by P1, is applied to buffer 104. The output 112 of the one or more pre-amplifier devices 102 that is split along path Tap 1, as indicated by P2, is however, also applied to the one or more variable delay buffer devices 106 and then to the inverter device 108. Accordingly, the same signal is applied to the input of the main (i.e., Tap 0) buffer 104 as the signal that is applied to the input of the one or more delay buffers 106. In various embodiments, the split may be passive (e.g., a node) or active (e.g., via a fan-out of the pre-amp 112. The FFE circuit output is located where paths Tap 0 and Tap 1 recombine, as indicated by node 114. In the example of FIG. 1A, the recombination is performed in the electrical domain. For example, in one embodiment, current mode logic is used to sum a current at the output of the first path P2 (i.e., at the output of the buffer 108) with the current of the first path (i.e., at the output of the main buffer 104, at node 114. Alternatively, other known summation circuits may be used to perform the summation of the signals of the first path P1 and the second path P2 at node 114.

It is emphasized that in the example of FIG. 1A, the summation of both paths (i.e., Tap 0 and Tap 1), sometimes referred to herein as the recombination of the Taps, is performed in the electrical domain (i.e., not in the optical domain). The resulting signal, sometimes referred to herein as the feed-forward equalized waveform, is applied to an optical device (e.g., laser) that is configured to convert the FFE waveform into an optical signal for the optical medium 118 (e.g., optical fiber).

The buffer device 104 in path Tap 0 may be a unity gain buffer, amplifier, or another buffer device capable of providing gain. Within Tap 1, the one or more variable delay buffer devices 106 may include common mode logic (CIVIL) buffer devices capable of having a tunable propagation delay by controlling their tail currents. Alternative, RF phase shifters may be utilized in place of the one or more variable delay buffer devices 106. The inverter device 108 may include a CMOS inverter logic device. In various embodiments, different one or more pre-amplifiers 110, delay buffers 106, main buffer 104 and buffer 108 may be used. It is believed that such components are generally known in the art, and they are therefore not discussed here in detail for brevity.

Figure 1B:
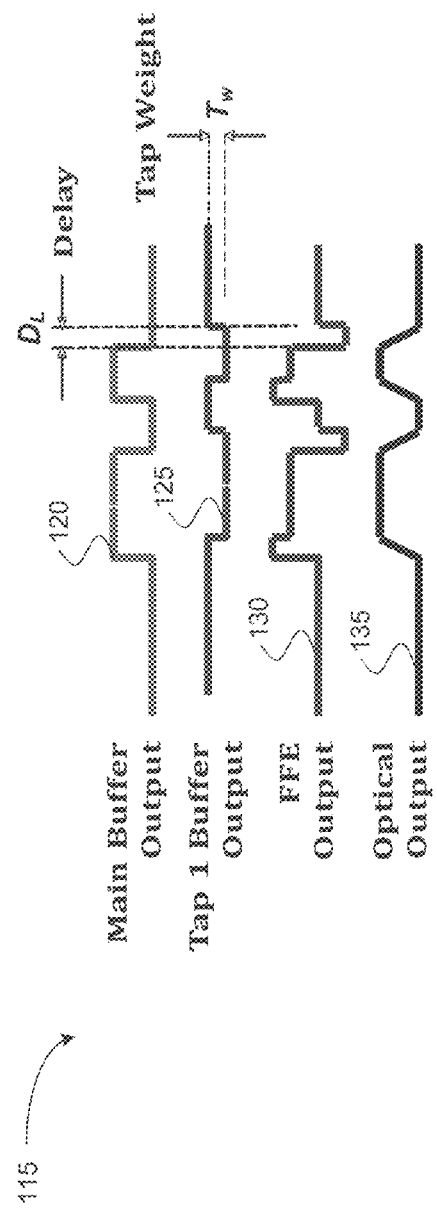
FIG. 1B illustrates example waveforms related to the feed-forward equalization circuit of FIG. 1A.

Referring now to FIG. 1B, the operation of circuit 100 is described with the aid of waveform diagrams 115. Along path Tap 0, as indicated by path P1, the output of the buffer 104 may be represented by waveform 120. Along path Tap 1, as indicated by P2, the output generated by the one or more variable delay buffer devices 106 and the inverter device 108 is given by waveform 125. More specifically, the one or more variable delay buffer devices 106 cause a predetermined delay ($D_L$) between the output of the buffer 104 represented by waveform 120 and the output from Tap 1 given by waveform 125.

Additionally, the delayed output from the one or more variable delay buffer devices 106 is inverted by inverter device 108. In essence, the waveform 125 generated from the output of Tap 1 is a delayed and complementary (i.e., inverted) version of the waveform 120 generated at the output of Tap 0 (i.e., the output of the main buffer 104). The amplitude of the output waveform 125 of Tap 1 is also attenuated relative to the output waveform 120 of Tap 0 to produce a tap weight ($T_w$). For example, a tap weight is an amplitude assigned to a given Tap (or branch) of the FFE circuit, relative to the other Taps of the FFE circuit. Waveform 120 from Tap 0 and waveform 125 from Tap 1 are then combined to generate an FFE output waveform 130. As such, the amount of attenuation associated with the tap weight $T_w$ along with the predetermined delay $D_L$, are utilized to generate an FFE output waveform 130 at the FFE circuit output located at where the Tap 0 and Tap 1 paths recombine, as indicated at 114. By applying the FFE output waveform 130 to an optical device 116 (e.g., a laser), an equalized optical output waveform 135 having a desired impulse response is generated. In contrast, without the FFE output waveform 130, the bandwidth limited optical device 116 generally distorts a clean waveform that may be provided to the optical device 116. For example, the waveform exiting the optical waveguide 118 may exhibit inter-symbol interference and may not provide reliable data transmission. Accordingly, the FFE waveform 130 that is combined in the electrical domain and provided to the optical device 116 yields a more responsive and reliable optoelectronic device by providing more sharp rise and fall times.

However, there is a fundamental tradeoff between efficiency and speed when the optical device 116 is driven as a lumped element. For example, a longer optical device has inherently higher capacitance, thereby reducing performance as the larger the optical device 116 is. Put differently, to increase performance, the optical device 116 is generally made smaller when driven as a lumped element.

Figure 2:
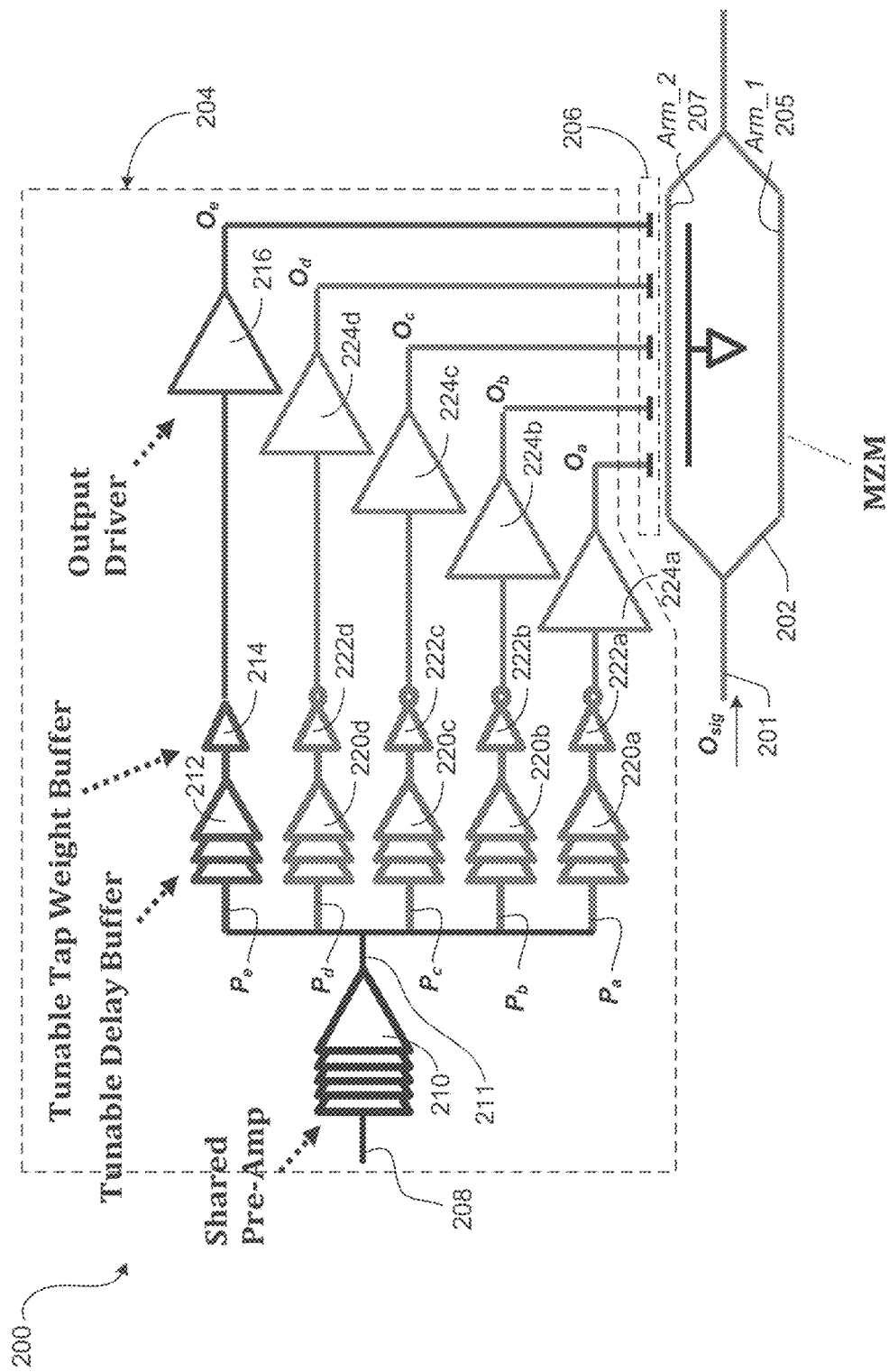
FIG. 2 illustrates a feed-forward optical equalization apparatus using an optical modulator, consistent with an exemplary embodiment.

Reference now is made to FIG. 2, which illustrates a feed-forward optical equalization (FFOE) apparatus using an optical modulator 200, consistent with an exemplary embodiment. The FFOE apparatus using the optical modulator 200 may include a multi-tap feed-forward equalization (FFE) circuit 204 that is coupled to an optical modulator device 202. The optical modulator device 200 may be any optical device that is a signal-controlled element that uses an electro optic effect or a thermo optic effect to modulate a beam of light that is provided at its input 201. In various embodiments, the modulation may be imposed on the phase, frequency, amplitude, and/or polarization of the beam.

For discussion purposes, a multi electrode 206 Mach-Zender Modulator (MZM) is used as an optical modulator device 202 by way of example only, not limitation. The MZM 202 includes an input 201 configured to receive an input signal Osig, which is split into a first arm 205 and a second arm 207. According to one example implementation (see FIG. 4), each electrode may include a segment (i.e., a length) of silicon waveguide within the modulation arm (i.e., Arm_2) of the MZM 202. The terms electrode and waveguide are used herein interchangeably. Based on the application of an electrical modulation signal across the segment of silicon waveguide, carriers (e.g., electrons) may be injected into or removed from the silicon segment. By injecting or removing electrical carriers (e.g., electrons), the refractive index, and thus, the optical path of the silicon segment is modulated or varied. As such, each path $P_a$-$P_e$ generates a refractive index change in each corresponding silicon segment of the multiple electrodes or segments 206.

The FFE circuit 204 may include one or more pre-amplifier devices 210; a first electrical path (i.e., Tap 0 path $P_e$) having a tunable propagation delay buffer device 212, a tunable tap weight buffer device 214, and a driver device 216; and a plurality of second electrical paths (i.e., Tap 1 paths $P_a$ to $P_d$), each having one or more tunable propagation delay buffer devices 220a to 220d. The one or more pre-amplifiers 210 may be shared between all paths (i.e., Pa to Pe) of the FFE circuit 204. In one embodiment, each path (i.e., Pa to Pe) has its own pre-amplifier 210.

In some embodiments, one or more paths of Tap 1 (i.e., $P_a$ to $P_d$) include inverter devices, represented by inverters 222a to 222d. Accordingly, whether each of the inverters 222a-222d is included is based on the desired control of a corresponding segment of the electrode 206. Each path of Tap 1 (i.e., $P_a$ to $P_d$) has an output driver 224a-224d, respectively. As depicted, a modulation signal (e.g., a PAM signal) may be applied to the input 208 of the one or more pre-amplifier devices 210. The PAM signal (e.g., PAM-2, PAM-4, PAM-8, etc.,) at the output 211 of the one or more pre-amplifier devices 210 is then split along the Tap 0 path ($P_e$) and the Tap 1 paths ($P_a$ to $P_d$). This split of the modulated signal 208 that was amplified by the pre-amplifiers, is performed in the electrical domain.

In operation, the first electrical path (i.e., Tap 0 path $P_e$) may generate a signal from the split amplified PAM signal that is similar to waveform 120 of FIG. 1B. The second electrical paths (i.e., Tap 1 paths $P_a$ to $P_d$) generate a signal from the split PAM signals that is similar to waveform 125 of FIG. 1B. In particular, in the example of FIG. 2, the waveforms generated at the output nodes ($O_a$ to $O_d$) of the second electrical paths (i.e., Tap 1 paths $P_a$ to $P_d$) are time delayed, and amplitude attenuated versions of the waveform generated at the output ($O_e$) of first electrical path (i.e., Tap 0 path $P_e$). In some embodiments, the waveforms are also inverted. The delays associated with the second electrical paths (i.e., Tap 1 paths $P_a$ to $P_d$) may be adjusted using the tunable propagation delay buffer devices 220a to 220d so that each of the Tap 1 paths ($P_a$ to $P_d$) interacts with the same photons, since each propagating photon may be skewed by the optical delay between the segments 206 of the MZM device 202. The sum of the waveforms generated at the outputs ($O_a$ to $O_d$) of the second electrical paths (i.e., Tap 1 paths $P_a$ to $P_d$) produce the overall tap weight associated with the Tap 1 paths $P_a$ to $P_d$. In addition, the tunable delay buffer device 212, along the first electrical path (i.e., Tap 0 path $P_e$), may provide an additional positive or negative delay.

Variation of the delay and amplitude relations between the Tap 0 and Tap 1 waveforms generate an equalization signal similar to the FFE waveform 130 as illustrated in FIG. 1B, which is encoded onto the phase of the incident optical signal $O_{sig}$ passing through the MZM device 202.

By virtue of recombining the paths of the first Tap (i.e., Tap 0, having output Oe) and the second Tap (i.e., Tap 1, having output $O_a$ to $O_d$) in the optical domain (i.e., not the electrical domain), over the segmented electrode 206, many limitations of an optical device that is being driven as a lumped element are mitigated. For example, splitting the Tap 1 paths over the multiple segments or electrodes 206 reduces the capacitance seen by each driver (e.g., 216, and 224a to 224d) that is driving a signal and modulating the phase by changing the effective path length of the segments. By segmenting the electrode 206, the effective capacitance of each segment becomes a fraction of the total length of the electrode, thereby improving the signal integrity and the bandwidth of the MZM device 202. Thus, the modulation bandwidth of the MZM device 202 may be enhanced and the impulse response of the modulated optical signal more efficiently controlled by using the FFE process that performs the recombination of the Tap paths in the optical domain, as discussed herein.

Figure 3:
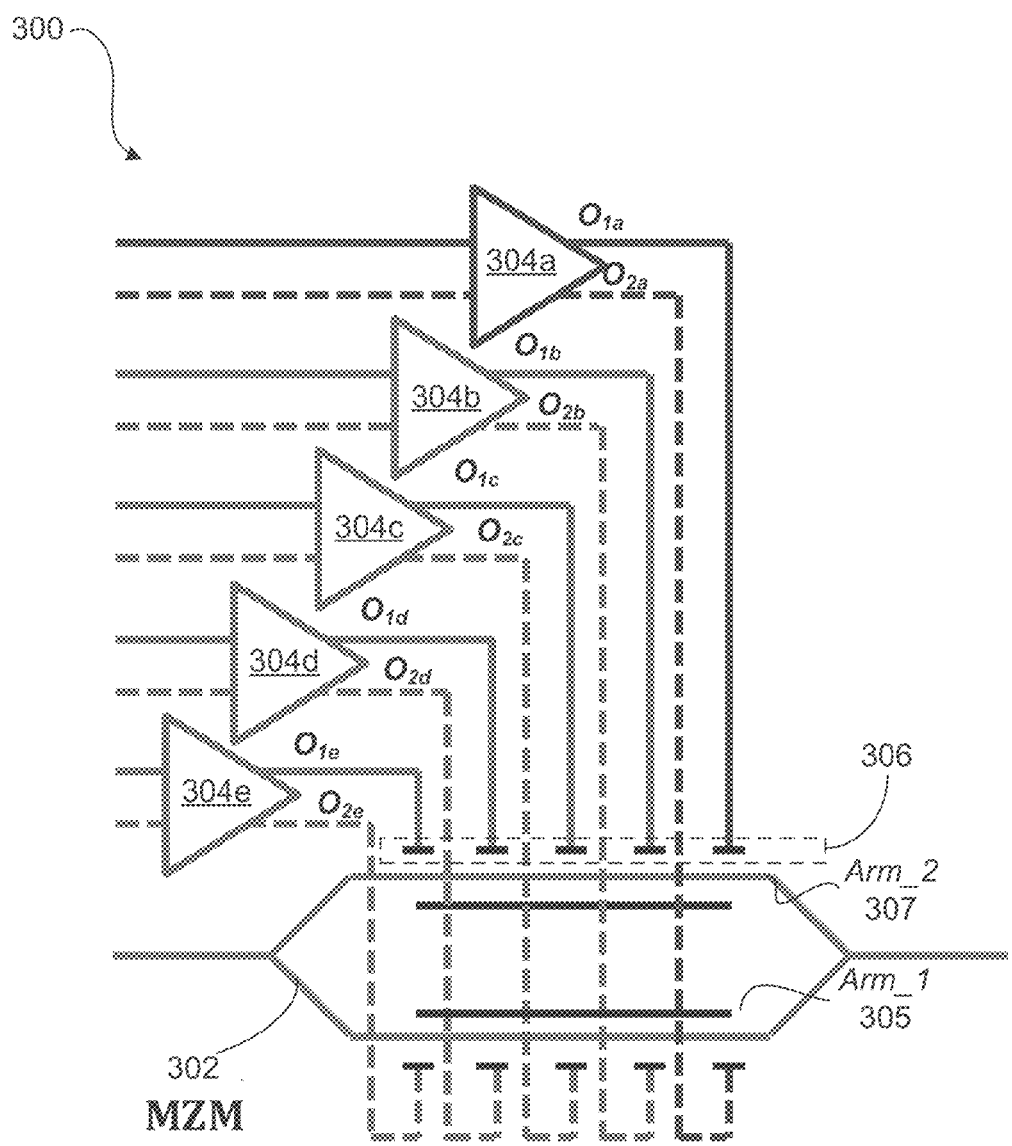
FIG. 3 illustrates an example Mach Zehnder Modulator device that is used in a push-pull configuration.

Reference now is made to FIG. 3, which illustrates a FFOE apparatus in a push-pull configuration. The concepts and components of the FFOE apparatus of FIG. 3 are similar to those of FIG. 2, and many components are therefore not repeated here for brevity. For example, the push-pull optical modulator 300 may include one or more pre-amplifier devices, a tunable delay buffer device, a tunable tap weight buffer device, driver devices, etc., similar to those of FIG. 2, except that the relevant paths are now complementary, as illustrated in part in FIG. 3. Accordingly, the drivers 304a to 304e each receive a complementary signal from their corresponding buffer (not shown). The output drivers 304a to 304e each provide complementary outputs $O_{1a}$ and $O_{2a}$ to $O_{1e}$ and $O_{2e}$, respectively. The output of the first Tap may be provided by the complementary outputs $O_{1a}$ and $O_{2a}$ of driver 304a. The output of the second Tap may be provided by the complementary outputs (i.e., $O_{1b}$ and $O_{2b}$ to $O_{1e}$ and $O_{2e}$) of drivers 304b to 304e, respectively, as illustrated in FIG. 3. Accordingly, both the first arm 305 and the second arm 307 of the MZM are controlled in a complementary way by the push-pull FFOE apparatus 300. Similar to the example embodiment of FIG. 2, the signals of both taps are recombined in the optical domain.

Using such push-pull configuration, the length of segments 306 may be less than those of the single ended MZM device 202 of FIG. 2 for generating the same phase shift. Accordingly, referring back to equation 1, for the same phase shift ($\Delta\varphi$), the length of the segment (L) can be made shorter for the same optical wavelength $\lambda$, of the incident optical signal. That is because the push-pull configuration of FIG. 3 enables to double the relative change of the refractive index ($\Delta n$) between the Mach-Zehnder arms generated by the applied electrical signal from the FFOE apparatus 300. For a given amount of voltage swing provided by each driver 304a to 304e, there is more phase modulation in the MZM 302.

Example Electrode Segment

Figure 4:
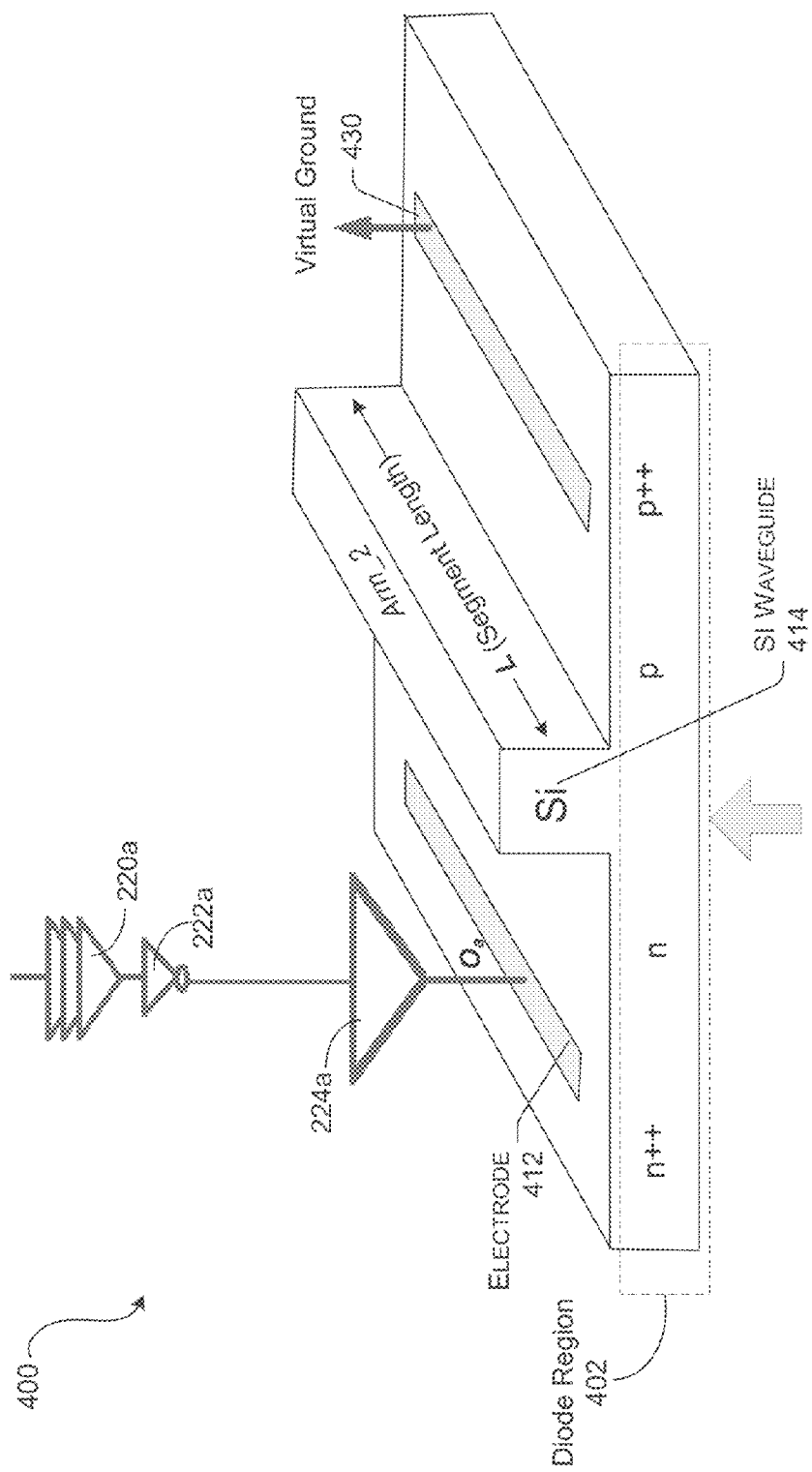
FIG. 4 illustrates a perspective view of a cross-section of an electrode, consistent with an exemplary embodiment.

With the foregoing overview of the different feed-forward equalization circuits, it may be instructive to discuss a physical implementation of a single segment or electrode connected to a silicon optical waveguide. To that end, FIG. 4 illustrates a perspective view of a cross-section of an optical waveguide, consistent with an exemplary embodiment. To facilitate this discussion, a symbolic representation of the one or more delay buffer devices 220a, inverters 222a, and output driver 224a of FIG. 2 are superimposed on the segment of the electrode 400 to provide better orientation. The electrode 412 may be viewed as part of a PN junction of a diode 402 that is formed between the electrode 412 and a virtual ground 430 at the other side of the optical waveguide. For example, the electrode 412 might be connected to the N doped region while the virtual ground 430 may be connected to the P doped region of PN junction.

During forward biasing, carriers are injected into the Si waveguide region creating a refractive index change, and thus, a phase change. Similarly, during reverse biasing, carriers are pulled away from the Si waveguide region, creating a refractive index change, thereby creating a corresponding phase change.

Example Experimental Architecture

Figure 5A:
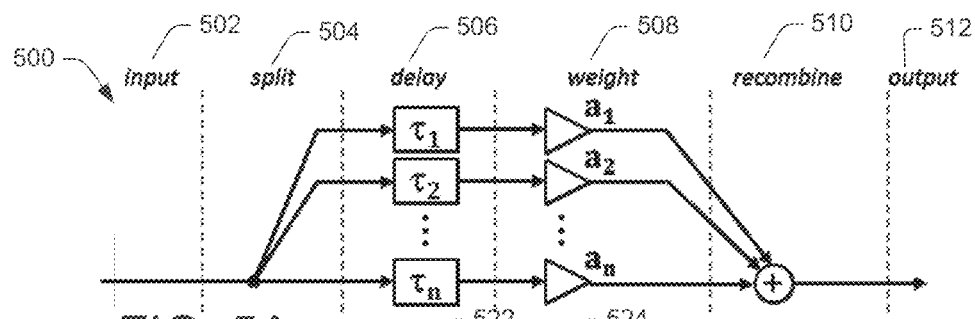
FIG. 5A illustrates a generalized block diagram of a feed-forward equalizer, consistent with an exemplary embodiment.

With the foregoing theoretical discussion of different feed-forward equalization circuits and physical characteristics of a segment of an electrode, it may be helpful to go over some actual experimental results. To that end, FIG. 5A illustrates a generalized block diagram of a feed-forward equalizer, consistent with an exemplary embodiment. The block diagram of FIG. 5A illustrates that there is an input stage 502, a split stage 504, a delay stage 506 a weight stage 508 a recombination stage 510, and an output stage 512.

Figure 5B:
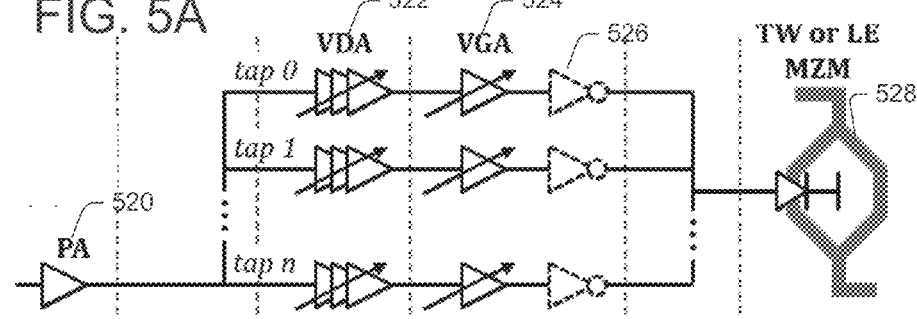
FIG. 5B illustrates a block diagram of a feed-forward equalization implementation in an electronic IC, consistent with an exemplary embodiment.

FIG. 5B illustrates a block diagram of an FFE implementation in an electronic IC, consistent with an exemplary embodiment. FIG. 5A includes a pre-amplifier (PA) 520 and one or more variable delay amplifiers (VDA) 522. In various embodiments, there may be one or more inverting or non-inverting variable gain amplifiers (VGA) 524 communicatively coupled to the output of the VDA 522. There may be a recombining stage 526 that may be used to drive a single device 528 within an MZM. In FIG. 5A, the recombination stage is in the electrical domain.

Figure 5C:
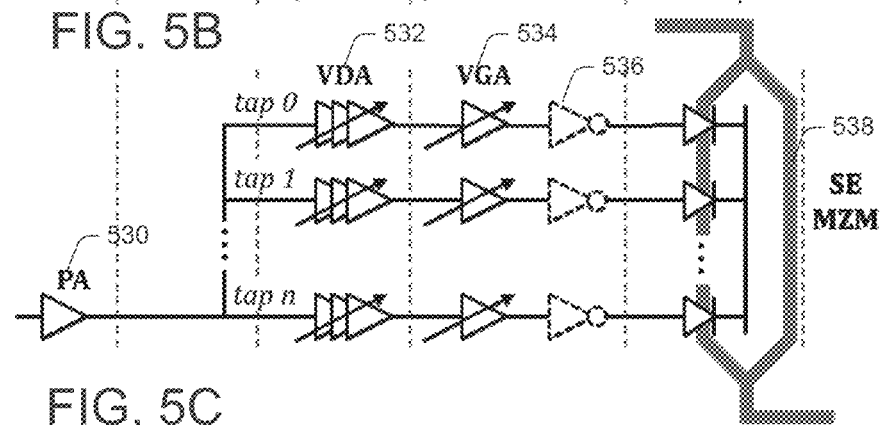
FIG. 5C illustrates another block diagram of a feed-forward equalization implementation in an electronic IC, consistent with an exemplary embodiment.

FIG. 5C illustrates another block diagram of an FFE implementation in an electronic IC, consistent with an exemplary embodiment. The components of the block diagram of FIG. 5C are similar to those of FIG. 5B and are therefore not repeated for brevity. The example of FIG. 5C provides an optical domain FFE implementation that integrates the photonic IC into the FFE path. In some embodiments, the transmitter sub-system includes a BiCMOS driver IC integrated with a segmented electrode (SE) Mach-Zehnder modulator (MZM) 538. The MZM 538 may leverage a feed-forward equalization (FFE) scheme, as depicted in FIG. 5C, to extend the bandwidth beyond the RC limit without utilizing electronic equalization circuits. By virtue of avoiding equalization, sometimes referred to herein as recombination of the taps) in the electrical domain, power and area are conserved. Accordingly, in the schematic of FIG. 5B, the recombination stage is in the optical domain. Notably, applicants have observed error-free 56-Gb/s operation, thereby enabling low latency FEC-free links for DC connectivity.

Figure 6:
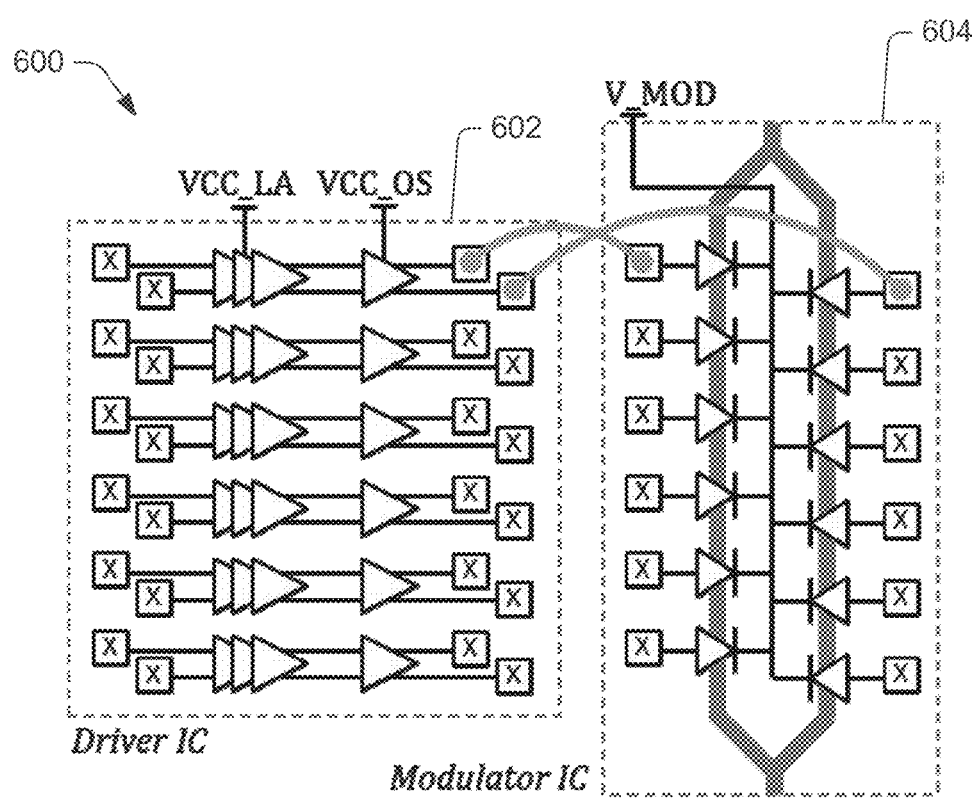
FIG. 6 illustrates a schematic of an assembled transmitter sub-system, consistent with an exemplary embodiment.

FIG. 6 illustrates a schematic of an assembled transmitter sub-system, consistent with an exemplary embodiment. A driver IC 602 is coupled (e.g., via wire bonds) to a modulator IC 604.

Example Implementation and Demonstration of Optical-Domain FFE

As discussed previously, to improve the RC-limited bandwidth of silicon photonic lumped-element (LE) MZMs with a reverse-biased PN-junction diode, traveling-wave (TW) or segmented electrode (SE) driving schemes may be used. The SE approach discretizes the phase modulator into multiple shorter segments, reducing the RC of each segment and allowing each segment to be driven faster, still as a lumped element, at the cost of added driver power consumption and chip real estate. However, compared to the more complicated TW approach, the SE scheme circumvents RF transmission line losses, and it does not require impedance terminations. In a typical non return to zero (NRZ) SE-MZM, each segment is driven with an identical waveform, delayed slightly to compensate for the optical delay between segments.

Together with the SE-MZM, applicants have used an FFE scheme to further extend the bandwidth without the use of equalized drivers. Referring back to FIG. 5A a generalized FFE block diagram is illustrated, wherein a signal is split into multiple taps, and each tap is delayed and weighted with respect to the others before the signals are recombined. Advantageously, such FFE may be used to extend optical device bandwidth. In FIG. 5B, the equalized waveform is entirely generated in a driver IC and subsequently applied to a bandwidth-limited optical device. Put differently, the recombination of the taps is performed in the electrical domain.

In an embodiment where linear elements are used (e.g., analog drivers, phase modulators, and a MZM near quadrature), the order of operations may be interchanged, as illustrated in FIG. 5c. Here, the FFE taps remain separate as they exit the driver IC 536 and are each used to drive isolated phase modulators within a SE-MZM 538. In this way, the taps (i.e., tap 0 to tap n) are recombined in the optical domain as optical waveforms rather than voltage or current waveforms. By independently adjusting the delays and weights of each tap in FIG. 5C, an optical-domain FFE filter can be realized using the SE-MZM 538 without the use of electronic equalization circuits.

Experimental Measurements and Results

By way of demonstrative example and not by limitation, applicants have configured a wire-bond assembly of a custom 6-channel driver IC and a 6-segment MZM on a printed circuit board. The driver was fabricated in an IBM (now GlobalFoundries) 130-nm BiCMOS process. Each channel comprises a 100-$\Omega$ differential input termination, a Cherry-Hooper limiting amplifier (LA), and a current-mode logic-based output stage (OS) configured to provide a swing of up to 1.6 V across unterminated differential outputs that drive the device anodes in a push-pull fashion. The common device cathodes are tied to a voltage supply (V_MOD). Each supply (VCC_LA, VCC_OS, and V_MOD) is powered from an independent 3.6 V source.

The SE-MZM was fabricated in an IBM (now GlobalFoundries) Photonics Enabled 90-nm CMOS process. It comprises six segments of 300-μm length electrically isolated and distributed on a 500-μm pitch matching with the driver. Each segment has a partially etched silicon waveguide (e.g., ridge structure), and implants define lateral PN-junction diodes operated in reverse bias. To tune the MZM bias point, each arm includes a resistive heater of 50-μm length that comprises a thin silicide layer embedded within a ridge waveguide. The measured capacitance of each segment with pad is 130 fF, and the measured Vπ-L is 2.04 V-cm. The modulator has a passive insertion loss of about 2 dB (or 5 dB during operation when biased at quadrature). A schematic of the assembly driven in push-pull configuration is illustrated in FIG. 6 by way of a block diagram.

Figure 7:
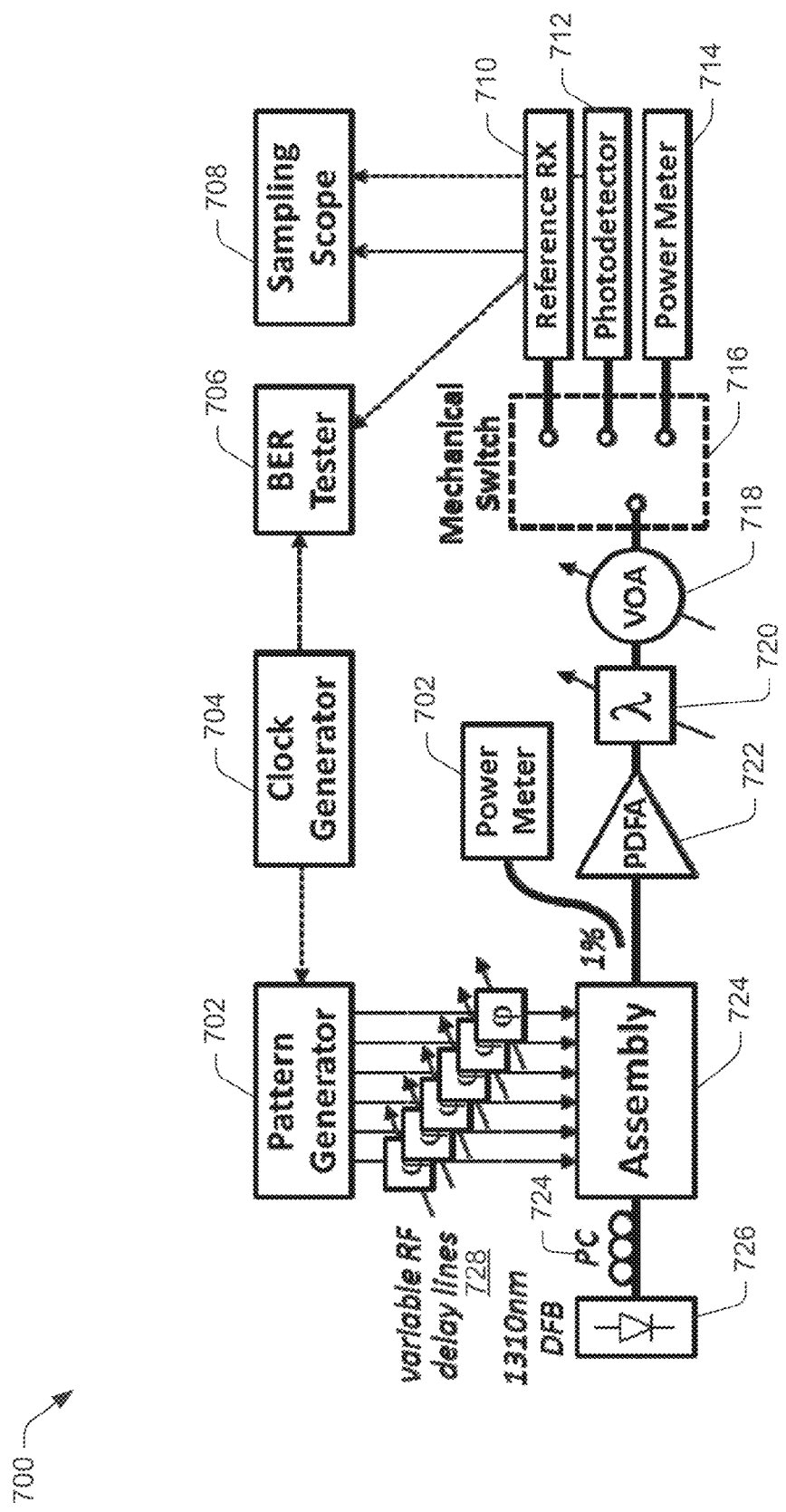
FIG. 7 illustrates an example experimental setup for a feed forward equalization test configuration.

FIG. 7 illustrates an example experimental setup 700 for an FFE test configuration. The setup 700 includes a 6-channel pattern generator 702, which supplies the input data streams through 6 passive RF phase shifters (labeled 'φ') 728. In one embodiment, a pseudorandom binary sequence (PRBS) is used. For example, a PRBS is a binary sequence that, while generated with a deterministic algorithm, cannot be readily predicted. It exhibits statistical behavior similar to a truly-random sequence.

Light from a 1310-nm butterfly-packaged distributed-feedback (DFB) laser 726, after first passing through a polarization controller (PC) 725, is edge-coupled to the assembly using tapered-lensed fibers. Coupling losses are about 4 dB per facet. The light is then passed through a praseodymium-doped fiber amplifier (PDFA) 722, a tunable optical bandpass filter (labeled 'λ') 720, and variable optical attenuator (VOA) 718. A mechanical switch 716 selects between an average optical power meter 714, a commercial 50-GHz photodetector 712, or a commercial 43-Gb/s reference receiver (RX) 710. Eye diagrams are obtained using a 60-GHz sampling oscilloscope 708, and bit error rate (BER) measurements are taken using a BER tester 706. The assembly is mounted on a thermo-electric cooler (TEC) and held steady at 36° C.

The assembly 724 is driven using 3 equalization taps: one main tap comprising 4 SE-MZM segments and two post-cursor taps, which use 1 segment each. The post-cursor taps are inverted and delayed with respect to the main tap. Since each driver channel shares common supply and bias settings, the main tap weight is approximately four times that of each of the post-cursor taps.

Figure 8A:
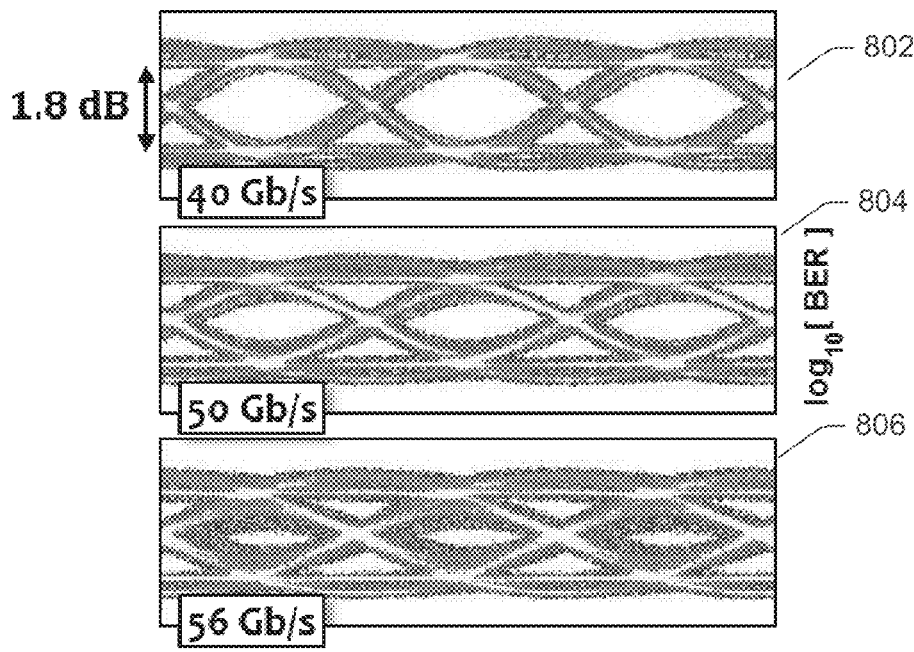
FIG. 8A illustrates eye diagrams taken at different transmitter output speeds.

FIG. 8A illustrates eye diagrams taken at different transmitter output speeds. For example, eye diagrams 802, 804 and 806 are at speeds of 40 Gb/s, 50 Gb/s, and 56 Gb/s, respectively. The equalized eyes show no inter-symbol interference up to 40 Gb/s, with slight closure at 50 Gb/s. One drawback with any FFE approach is the reduction in extinction ratio, which in this case is measured to be 1.8 dB. Increasing the number of segments further improves the extinction ratio.

Figure 8B:
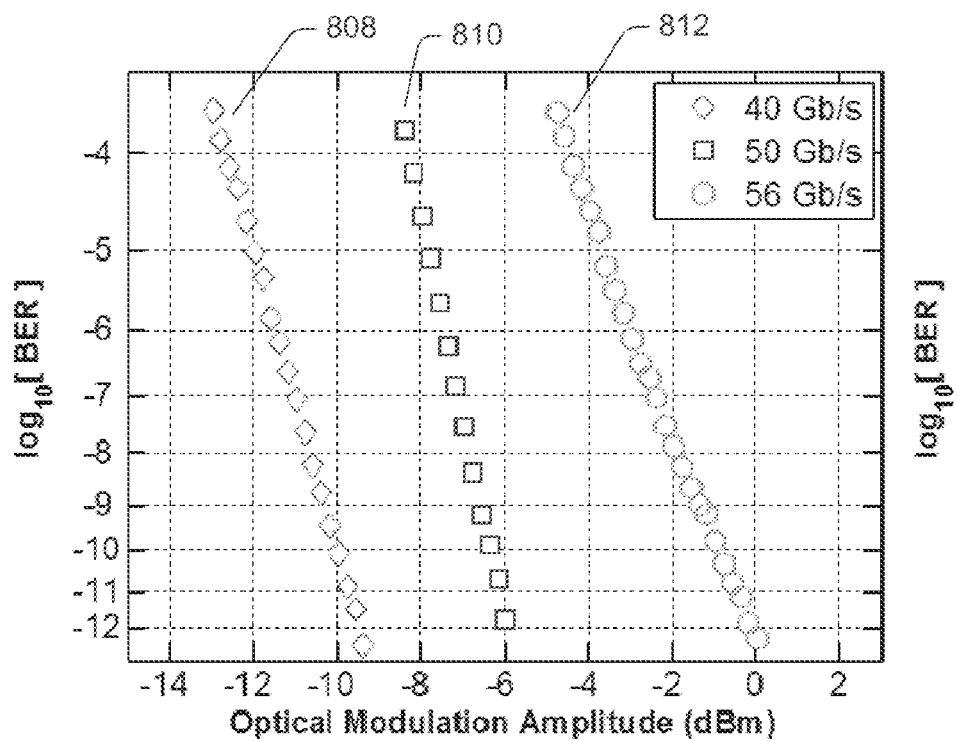
FIG. 8B illustrates bit error rate plots of sensitivity for different feed forward equalization test configurations.
Figure 8C:
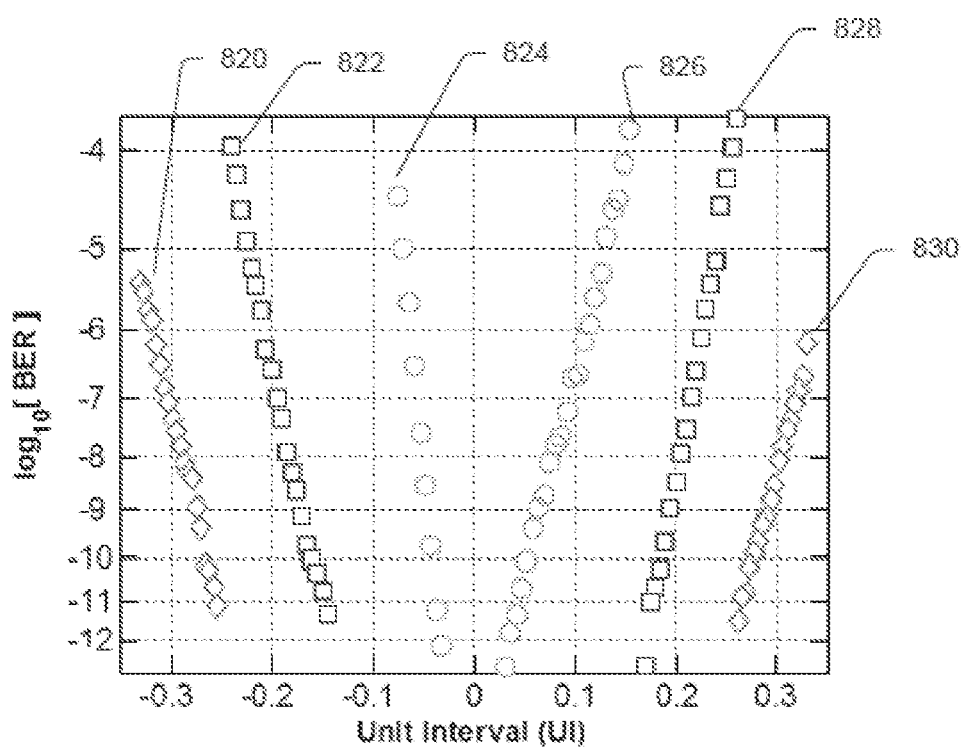
FIG. 8C illustrates bit error rate plots of timing margin for different feed forward equalization test configurations.

An extended BER measurement was performed at 56 Gb/s for more than one hour during which >200 Tb were transmitted and one error was received resulting in a BER<5>10−15. In this regard, FIGS. 8B and 8C illustrate BER plots of sensitivity and timing margin, respectively. These measurements were recorded at the same three data rates. The 40-Gb/s sensitivity in optical modulation amplitude (OMA) is −9.5 dBm with penalties of 3.5 dB and 9.5 dB in moving to 50 Gb/s and 56 Gb/s, respectively. Timing margins of 0.52 unit intervals (UI), 0.32 UI, and 0.07 UI are obtained at 40 Gb/s, 50 Gb/s, and 56 Gb/s, respectively. All timing margin curves were recorded by setting the OMA at the receiver to be 3 dB above the sensitivity point for the specific data rate. The sensitivity and timing margin degradation incurred when increasing the data rate are due in part to both the transmitter and the receiver, which is specified only to 43 Gb/s. The measurements reveal no evidence of a hard error floor. That is, error rates are limited only by amplitude and timing margins and may be improved when taken using a higher-bandwidth receiver.

The power dissipated by the complete assembly was 2.3 W with 1.4 W dissipated in the LA stages. The laser consumed a wall-plug power of 0.2 W, resulting in an overall transmitter power 2.5 W or about 45 pJ/b at 56 Gb/s. In one scenario, the IC discussed herein maintained six fully independent channels. Nevertheless, a shared input and pre-amplifier (PA) stage with on-chip tunable delays, as shown in FIG. 5C may have a dramatic power saving effect. By simple estimation, reducing the LA from six lanes to one could bring the overall efficiency from 45 to 23 pJ/b.

CONCLUSION

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

For example, the above embodiments and principles may be applicable with different types of optical modulation device, different delay control means, different gain or loss inducing circuitry, and different signal inverting mechanisms. For example, although the depicted embodiments introduce tunable or variable delay devices, fixed delay and tap weight generating devices may be incorporated into a circuit implementing these embodiments. Further, any signal discussed herein may be scaled, buffered, scaled and buffered, converted to another mode (e.g., voltage, current, charge, time, etc.,), or converted to another state (e.g., from HIGH to LOW and LOW to HIGH) without materially changing the underlying control method.

Unless otherwise stated, any measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

What is claimed is:

1. An optical communication system, comprising:
an optical modulator device including a first and a second waveguide segment, which is configured to modulate an incident optical signal; and
a feed-forward equalization circuit including a first tap and a second tap, wherein:
the first tap is coupled to the first segment of the optical modulator,
the second tap is coupled to the second segment of the optical modulator,
the first tap is configured to generate a first modulation signal,
the second tap is configured to generate a second modulation signal,
the first modulation signal is attenuated relative to the second modulation signal,
the first and the second modulation signals are time-delayed with respect to each other,
the second tap comprises a plurality of paths, each path driving a corresponding segment of the second segment,
a recombination of the first tap and the second tap is in the optical domain,
the feed-forward equalization circuit comprises a pre-amplifier that is shared between the first tap and the second tap; and
the first tap of the feed-forward equalization circuit comprises:
a tunable delay buffer device coupled to an output of the shared pre-amplifier;
a tunable tap weight buffer device coupled to an output of the tunable delay buffer device; and
a first output driver having an input coupled to the output of the tunable delay buffer device and an output coupled to the first segment of the optical modulator.

2. The optical communication system of claim 1, wherein the first and second modulation signals are inverted with respect to each other.

3. The optical communication system of claim 1, wherein the optical modulator comprises a Mach Zehnder Modulator (MZM) having a first arm and a second arm, the first arm including the first and the second segment.

4. The optical communication system of claim 1, wherein the optical modulator comprises an Electro-Absorption Modulator (EAM) having an electro-absorption region including the first and the second segment.

5. The optical communication system of claim 1, wherein each path generates a change in a refractive index in its corresponding segment that it is driving.

6. The optical communication system of claim 1, wherein a delay and amplitude relations between the first tap and the second tap generate an equalization signal, which is encoded onto a phase or amplitude of the incident optical signal passing through the optical modulator.

7. The optical communication system of claim 1, wherein:
the first modulation signal is complementary,
the second modulation signal is complementary, and
each of the first and second modulation signals is operative to control the optical modulator device in a push-pull configuration.

8. The optical communication system of claim 1, wherein the first and second modulation signals are time-delayed with respect to each other to compensate for an optical delay between the first and second waveguide segments.

9. The optical communication system of claim 1, wherein the second tap of the feed-forward equalization circuit comprises:
a second tunable delay buffer device coupled to an output of the shared pre-amplifier; and
a second output driver having an input coupled to the output of the second tunable delay buffer device and an output coupled to the second segment of the optical modulator.

10. The optical communication system of claim 9, wherein the second tap of the feed-forward equalization circuit further comprises an inverter coupled between the second tunable delay buffer and the second driver.

11. The optical communication system of claim 9, wherein the first and second output drivers are in BiCMOS technology.

12. A method of optical equalization using an optical modulator, comprising:
splitting an electrical modulation signal into a first modulation signal and a second modulation signal;
delaying the second modulation signal relative to the first modulation signal;
attenuating an amplitude of the second modulation signal relative to the first modulation signal;
applying the first modulation signal to a first waveguide segment of the optical modulator for providing optical modulation;
applying the second modulation signal that is delayed and attenuated relative to the first modulation signal, to a second waveguide segment of the optical modulator;
splitting the second modulation signal into a plurality of additional modulation signals, each additional modulation signal driving a corresponding segment of the second segment; and
sharing a pre-amplifier between a first tap and a second tap of the electrical modulation signal;
coupling a tunable delay buffer device to an output of the pre-amplifier;
coupling a tap weight buffer device to an output of the tunable delay buffer; and
coupling an input of a first output driver to the output of the tunable delay buffer device and an output to the first waveguide segment of the optical modulator, wherein:
both the applied first and second modulation signals generate a feed-forward equalized optical signal that is recombined in the optical domain,
the first modulation signal is driven by a first tap of the optical modulator, and
the second and the additional modulation signals are driven by a second tap of the optical modulator.

13. The method of claim 12, further comprising inverting the second modulation signal upon delaying the second modulation signal relative to the first modulation signal.

14. The method of claim 12, wherein the optical modulator comprises a Mach Zehnder Modulator (MZM) having a first arm and a second arm, the first arm including the first and the second waveguide segments.

15. The method of claim 12, wherein the optical modulator comprises an Electro-Absorption Modulator (EAM) having an electro-absorption region including the first and the second waveguide segments.

16. The method of claim 12, wherein each modulation signal generates a change in a refractive index in its corresponding waveguide segment.

17. The method of claim 12, wherein the feed-forward equalized optical signal equalization signal, is encoded onto a phase or amplitude of an incident optical signal passing through the optical modulator based on a delay and amplitude relations between the first and second modulation signals.

* * * * *